United States Patent
Bozzi et al.

(10) Patent No.: US 8,072,651 B2
(45) Date of Patent: Dec. 6, 2011

(54) SYSTEM AND PROCESS FOR SIMULTANEOUSLY READING MULTIPLE FORMS

(75) Inventors: Steven A. Bozzi, Narragansett, RI (US); Henry J. Constant, Jr., West Warwick, RI (US); Bruce I. Parkes, Cranston, RI (US)

(73) Assignee: GTech Corporation, Providence, RI (US)

( * ) Notice: Subject to any disclaimer, the term of this patent is extended or adjusted under 35 U.S.C. 154(b) by 363 days.

(21) Appl. No.: 12/236,843

(22) Filed: Sep. 24, 2008

(65) Prior Publication Data

US 2009/0027734 A1  Jan. 29, 2009

Related U.S. Application Data

(63) Continuation-in-part of application No. 11/376,052, filed on Mar. 14, 2006, now Pat. No. 7,920,299.

(60) Provisional application No. 60/661,698, filed on Mar. 14, 2005.

(51) Int. Cl.
*H04N 1/40* (2006.01)
(52) U.S. Cl. ........ 358/471; 358/448; 358/473; 358/474; 382/275; 382/174; 235/462.01; 235/470
(58) Field of Classification Search .................. 358/474, 358/486, 475, 509, 487, 498, 501, 448, 471, 358/473; 382/275, 174, 254; 235/462.02, 235/470, 456, 472, 462.25
See application file for complete search history.

(56) References Cited

U.S. PATENT DOCUMENTS

| | | | |
|---|---|---|---|
| 4,141,036 A | 2/1979 | Diehl | |
| 4,240,748 A | 12/1980 | Blanc et al. | |
| 4,724,307 A | 2/1988 | Dutton et al. | |
| 4,736,109 A | 4/1988 | Dvorzsak | |
| 4,760,247 A | 7/1988 | Keane et al. | |
| 5,039,847 A | 8/1991 | Morii et al. | |
| 5,216,595 A | 6/1993 | Protheroe | |
| 5,239,165 A | 8/1993 | Novak | |
| 5,258,605 A * | 11/1993 | Metlitsky et al. | 235/462.32 |
| 5,262,624 A | 11/1993 | Koch | |
| 5,362,105 A | 11/1994 | Scott | |
| 5,417,424 A | 5/1995 | Snowden et al. | |

(Continued)

FOREIGN PATENT DOCUMENTS

EP  1 172 756 A1  1/2002

(Continued)

OTHER PUBLICATIONS

International Search Report and Written Opinion dated Jan. 25, 2010, International Application No. PCT/US2009/058018.

(Continued)

*Primary Examiner* — Negussie Worku
(74) *Attorney, Agent, or Firm* — McCarter & English, LLP; Kia L. Freeman, Esq.

(57) ABSTRACT

An optical reader with a single optical assembly that receives images from at least two different environments. For example, one environment may be constructed in a first chamber into which a document or bulk item with a bar code may be placed. The other environment may be constructed in a second chamber with an active drive mechanism that transports a document with optical readable markings to a reading location. The environments may be separated by a baffle that prevents light from leaking between the environments, and the electronics and software are constructed to read and decode information that is found in the images from both environments either sequentially or simultaneously.

20 Claims, 3 Drawing Sheets

U.S. PATENT DOCUMENTS

| | | | |
|---|---|---|---|
| 5,452,379 A | 9/1995 | Poor | |
| 5,673,125 A * | 9/1997 | Merecki et al. | 358/487 |
| 5,734,153 A | 3/1998 | Swartz et al. | |
| 5,818,026 A * | 10/1998 | Melling et al. | 235/470 |
| 5,821,518 A | 10/1998 | Sussmeier et al. | |
| 5,834,749 A | 11/1998 | Durbin | |
| 5,945,655 A | 8/1999 | Gilgeous et al. | |
| 6,150,930 A | 11/2000 | Cooper | |
| 6,157,435 A | 12/2000 | Slater et al. | |
| 6,176,429 B1 | 1/2001 | Reddersen et al. | |
| 6,199,044 B1 | 3/2001 | Ackley et al. | |
| 6,223,986 B1 | 5/2001 | Bobba et al. | |
| 6,234,899 B1 | 5/2001 | Nulph | |
| 6,262,670 B1 | 7/2001 | Ballou | |
| 6,340,114 B1 | 1/2002 | Correa et al. | |
| 6,356,365 B1 * | 3/2002 | Oida et al. | 358/475 |
| 6,357,658 B1 | 3/2002 | Garczynski et al. | |
| 6,366,696 B1 | 4/2002 | Hertz et al. | |
| 6,494,372 B2 | 12/2002 | Bruchlos et al. | |
| 6,650,427 B2 | 11/2003 | Brooks et al. | |
| 6,722,569 B2 | 4/2004 | Ehrhart et al. | |
| 6,736,319 B2 | 5/2004 | Swanson et al. | |
| 6,760,476 B2 | 7/2004 | Meder | |
| 6,776,337 B2 | 8/2004 | Irwin, Jr. et al. | |
| 6,875,015 B1 * | 4/2005 | Tiernan | 432/106 |
| 6,875,105 B1 | 4/2005 | Behm et al. | |
| 6,887,153 B2 | 5/2005 | Walker et al. | |
| 6,929,184 B2 * | 8/2005 | Barkan | 235/462.25 |
| 6,954,290 B1 * | 10/2005 | Braudaway et al. | 358/3.26 |
| 6,971,577 B2 * | 12/2005 | Tsikos et al. | 235/462.01 |
| 7,060,968 B1 | 6/2006 | Leviton | |
| 7,090,131 B2 | 8/2006 | Natsuno | |
| 7,124,945 B2 | 10/2006 | Kim | |
| 7,247,095 B2 | 7/2007 | Nulph | |
| 7,527,206 B2 * | 5/2009 | Zhu et al. | 235/462.27 |
| 7,635,088 B2 | 12/2009 | Chung et al. | |
| 7,674,171 B2 | 3/2010 | Walker et al. | |
| 2001/0025880 A1 | 10/2001 | Bruchlos et al. | |
| 2001/0029513 A1 * | 10/2001 | Kuwano et al. | 707/522 |
| 2002/0010022 A1 | 1/2002 | Vincent | |
| 2002/0048403 A1 | 4/2002 | Guerreri | |
| 2002/0109866 A1 * | 8/2002 | Yang et al. | 358/474 |
| 2003/0102376 A1 * | 6/2003 | Meier et al. | 235/462.25 |
| 2003/0173404 A1 | 9/2003 | Chung et al. | |
| 2003/0186734 A1 | 10/2003 | LeMay et al. | |
| 2004/0029630 A1 | 2/2004 | Walker et al. | |
| 2004/0160652 A1 * | 8/2004 | Kimura et al. | 358/514 |
| 2004/0209665 A1 | 10/2004 | Walker et al. | |
| 2004/0218835 A1 | 11/2004 | Loew | |
| 2005/0092841 A1 * | 5/2005 | Barkan | 235/462.25 |
| 2005/0098633 A1 | 5/2005 | Poloniewicz et al. | |
| 2005/0161511 A1 | 7/2005 | Parker et al. | |
| 2005/0163385 A1 | 7/2005 | Thakur | |
| 2005/0233797 A1 | 10/2005 | Gilmore et al. | |
| 2005/0237580 A1 * | 10/2005 | Coleman et al. | 358/462 |
| 2005/0238260 A1 | 10/2005 | Coleman et al. | |
| 2006/0063589 A1 | 3/2006 | Chong | |
| 2006/0079311 A1 | 4/2006 | Nulph | |
| 2006/0122910 A1 | 6/2006 | Chau et al. | |
| 2006/0152595 A1 | 7/2006 | Ryu et al. | |
| 2006/0221354 A1 | 10/2006 | Slaten et al. | |
| 2006/0255145 A1 | 11/2006 | Chung et al. | |
| 2006/0290886 A1 | 12/2006 | Santos | |
| 2006/0291004 A1 | 12/2006 | Dymetman | |
| 2007/0109511 A1 | 5/2007 | Kelly et al. | |
| 2008/0240614 A1 | 10/2008 | Garcia | |
| 2009/0015883 A1 * | 1/2009 | Kim | 358/475 |
| 2009/0020606 A1 | 1/2009 | Chung et al. | |
| 2009/0021798 A1 * | 1/2009 | Abahri | 358/474 |
| 2009/0051814 A1 | 2/2009 | Shirane et al. | |
| 2009/0167960 A1 | 7/2009 | Miyasato | |
| 2010/0060943 A1 | 3/2010 | Monga et al. | |

FOREIGN PATENT DOCUMENTS

| | | |
|---|---|---|
| EP | 1 441 315 A1 | 7/2004 |
| WO | WO 00/04487 | 1/2000 |
| WO | WO 01/04571 A1 | 1/2001 |
| WO | WO 2006/099504 | 9/2006 |
| WO | WO 2007/114241 A1 | 10/2007 |

OTHER PUBLICATIONS

Boone, J.M. et al., "Analysis and Correction of Imperfections in the Image Intensifier-TV-Digitizer Imaging Chain," Medical Physics, vol. 18, No. 2, Mar./Apr. 1991, pp. 236-242.

European Patent Application No. 09166997.8, filed Mar. 14, 2006: Search Report, dated Sep. 9, 2009 (8 pages).

European Patent No. 1 861 809: Notice of Opposition, dated Feb. 4, 2010, and Facts and Arguments in Support of Opposition (24 pages).

Fantozzi, S. et al., "A Global Method Based on Thin-plate Splines for Correction of Geometric Distortion: An Application to Fluoroscopic Images," Medical Physics, vol. 30, No. 2, Feb. 2003, pp. 124-131.

Glasbey, C.A. et al., "A Review of Image Warping Methods," Journal of Applied Statistics, vol. 25, No. 2, Apr. 1998, pp. 155-171.

International Patent Application No. PCT/US2006/009362: International Search Report and Written Opinion; Date of mailing: Sep. 21, 2006 (16 pages).

International Patent Application No. PCT/US2009/057610: International Search Report and Written Opinion; Date of mailing: May 19, 2010 (9 pages).

International Patent Application No. PCT/US2009/065660: International Search Report and Written Opinion; Date of mailing: Mar. 8, 2010 (13 pages).

U.S. Appl. No. 12/234,992, filed Sep. 22, 2008: Office Action, dated Mar. 16, 2011.

U.S. Appl. No. 13/026,712, filed Feb. 14, 2011: Office Action, dated Jun. 13, 2011.

* cited by examiner

SYSTEM AND PROCESS FOR SIMULTANEOUSLY READING MULTIPLE FORMS

RELATED APPLICATIONS

The present invention is a continuation-in-part of U.S. patent application Ser. No. 11/376,052, filed Mar. 14, 2006, now U.S. Pat. No. 7,920,299 entitled SYSTEM AND METHOD FOR PROCESSING A FORM, which claims priority from U.S. Provisional Patent Application Ser. No. 60/661,698, which was filed on Mar. 14, 2005. Each of these patent applications is of common ownership with the present invention. These earlier applications are incorporated herein by reference.

BACKGROUND OF THE INVENTION

1. Field of the Invention

The present invention is related to a system and a process for simultaneously or sequentially reading diverse types of data on single or multiple forms or documents or bulk items like packets of tickets or retail goods.

2. Background Information

FIG. 1 illustrates an exemplary terminal 2 that includes a reader 4 for bar codes and a slot 6 leading to an internally mounted optical reader 5 of markings on a different form. These terminals 2 are found in locations where it is important, if not essential, among other purposes, to identify, verify or authenticate the markings or data on the form and/or document that is being presented. One such exemplary venue is a retail establishment where agents may sell lottery instant, online game tickets; packets of tickets; play slips; and/or other types of lottery games in addition to other commonly purchased retail or bulk items. Commonly, when an instant ticket is purchased by a player, the ticket has a bar code that is uncovered on the ticket. Operationally, the agent typically scans the bar code on the ticket by presenting the ticket to the reader 4, the bar code information is sent to a central location via the terminal where the ticket is verified as being a winning ticket, and authorization is passed back to the agent to pay the player a winning amount. The winning amount of a particular ticket is often found on the ticket.

Herein the term "document" is defined to include but not be limited to any type of form or document, e.g., lottery ticket, game ticket or play slip, and the phrase "bulk items" is defined to include but not be limited to any type of retail item, e.g., packets of tickets, t-shirts, toy, mug, or other item typically vended in a retail environment.

The internal optical reader 5 handles documents by an active drive mechanism. In the foregoing example, such active drive mechanisms are useful for reading lottery play slips. Such play slips have many forms, but usually include a set of numbers, icons, or other devices that are selected by the player marking the play slip for a future drawing or event. One common type is a Keno play slip, where a group of numbers are pre-selected by the player and fed into the terminal 6. This information is sent to a central location via the terminal where it is logged and serialized. The serial number is sent back to the terminal that prints out a receipt slip with the numbers and the serial number, etc., and typically a bar code of the serial number and the date and game being played.

Active drive mechanisms are defined herein as tractor or pinch drive mechanisms using rubber wheels, endless belts or tracks, or vacuum systems to transport documents to the internal optical reader 5.

Since play slips are handled by players, markings will vary, and the tickets may be bent, rolled or otherwise mishandled. The terminal has a slot 6 leading to the internal optical reader 5. An active drive mechanism flattens, securely holds, registers, aligns and carries the play slip into and past a reader and returns it to the player along with a play receipt.

With respect to the Keno example above, the Keno numbers are drawn and if the numbers drawn match some or all the numbers selected on the receipt, the play slip is a winner and the receipt can be presented to the agent for payment. Upon presentation, the bar code on the winning receipt is scanned by the reader 4, and sent to a central location whereupon, if the receipt is confirmed to be a winner, it is validated and authorization is returned to the agent to pay the user.

The active drive mechanism provides many advantages in that the document is held at a fixed, known distance from a light source and the optical imager, it is held flat and aligned, and the drive moves the document in front of the imager at a uniform rate. Such a mechanism, thus, removes many variables with respect to reading a document and enhances reliability in the reading of the document.

One limitation of such terminals is that two separate optical readers are required to accomplish the above-discussed objectives. Another limitation is that the cost of each reader is a significant portion of the cost incurred in the manufacture of the terminal and, in fact, often times results in a 40-50% increase in the overall cost of the terminal. Another limitation is that the use of two readers in the validation process may decrease the reliability (neither can be 100% reliable) of the information being read. Still another limitation is that terminals utilizing two separate optical readers are typically larger devices, which require a larger "footprint" and thereby take up a larger portion of the counter space available on a retailer's checkout counter.

It would be advantageous to provide a single optical reader that is capable of simultaneously or sequentially reading different types of documents or forms, is capable of simultaneously or sequentially reading different types information on the same document or form, and is also capable of performing those reading functions simultaneously with or sequentially to reading bulk items.

SUMMARY OF THE INVENTION

The present invention addresses the limitations of the prior art by providing a single optical reader assembly with one or more a photo-sensitive surfaces (imagers) that is arranged to receive images from at least two fields of view, and where the environment associated with each field of view may be different, e.g., different lighting, differently sized chambers to accommodate different sizes of documents and bulk items. Either or both fields of view, in turn, may be divided into one or more sub-fields of view. For example, an instant ticket or a bulk item may be in one field of view and a play slip in the other. These two documents may be read simultaneously or sequentially.

Illustratively, a single optical reader is employed where its field of view is partitioned into two or more fields of view separated by an optical barrier or baffle. A first field of view is designed to read a first code on a first document type, e.g., a bar code, and the second field of view reads a second form type, e.g., a play slip filled in by the player, where the play slip is handled by an active drive mechanism. In one example each field of view is imaged on separate photo-sensitive surfaces. In this example, both photo-sensitive surfaces are scanned by electronics to produce a single video signal. The two optical surfaces may provide different resolutions and they may provide depth perception to bulk items.

In one embodiment, the field of view of the optical reader includes a rectangular matrix of pixels with a 1280 by 1024 resolution. A portion of the pixels are dedicated to reading a first code and another portion to read the second type in the active drive mechanism. Illustratively, if the first code is a bar code, the reader searches for video lines from a first field of view that correspond to the optical response associated with standard bar code print patterns; and, if the second code are the markings on a play slip, the reader interprets the second field of view looking for marks filled in by the player. The reader herein includes a computer processor with software that determines the forms and/or objects in the field of view. Note that the single rectangular matrix referenced above may comprise a single contiguous photo-sensitive surface or it may comprise, in other embodiments, a number of photo-sensitive surfaces.

Illustratively, the bar code may use any standard symbols, e.g., 1-D or 2-D bar code; the camera may be a CCD or CMOS, diode or transistor arrays, and the light source may be a LED array of a frequency (e.g., 630 nm) or spectrum that matches the camera sensitivity and the printed surfaces being read. Other optical imagers and other light sources may be used in the present invention. The selection an optical imager, light source and encoding/decoding of bar codes are well-known in the industry and, so, are only incidentally mentioned below.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN
ILLUSTRATIVE EXAMPLE

The following discussion illustrates an example of the present application where markings on one type of form or document are read simultaneously or sequentially with markings on another type of form or document. For example, a bar code on an instant ticket may be read simultaneously with the markings on a play slip. Other documents however, may be advantageously processed by the present invention. Moreover, while the discussion below illustrates use of an active drive mechanism for documents, in other applications two or more documents and bulk items may be processed without an active drive mechanism, and conversely two active drive mechanisms may be found in other applications.

Figure 1:
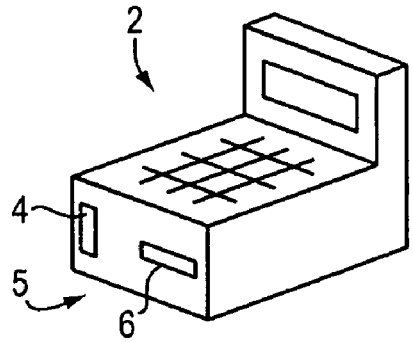
FIG. 1 is a view of a prior art terminal with optical readers.
Figure 2A:
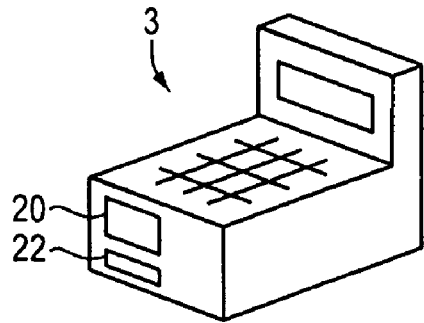
FIG. 2A is a view of an optical reader constructed in accordance with the present invention.

FIG. 2A illustrates a terminal 3 with an opening 20 to a chamber where a document or a bulk item, such as a bar coded ticket or a pack of tickets, respectively, may be inserted and read, and an entrance 22 to another chamber where another document, such as a play slip, can be inserted and read. These readings may be sequential or simultaneous.

Figure 2B:
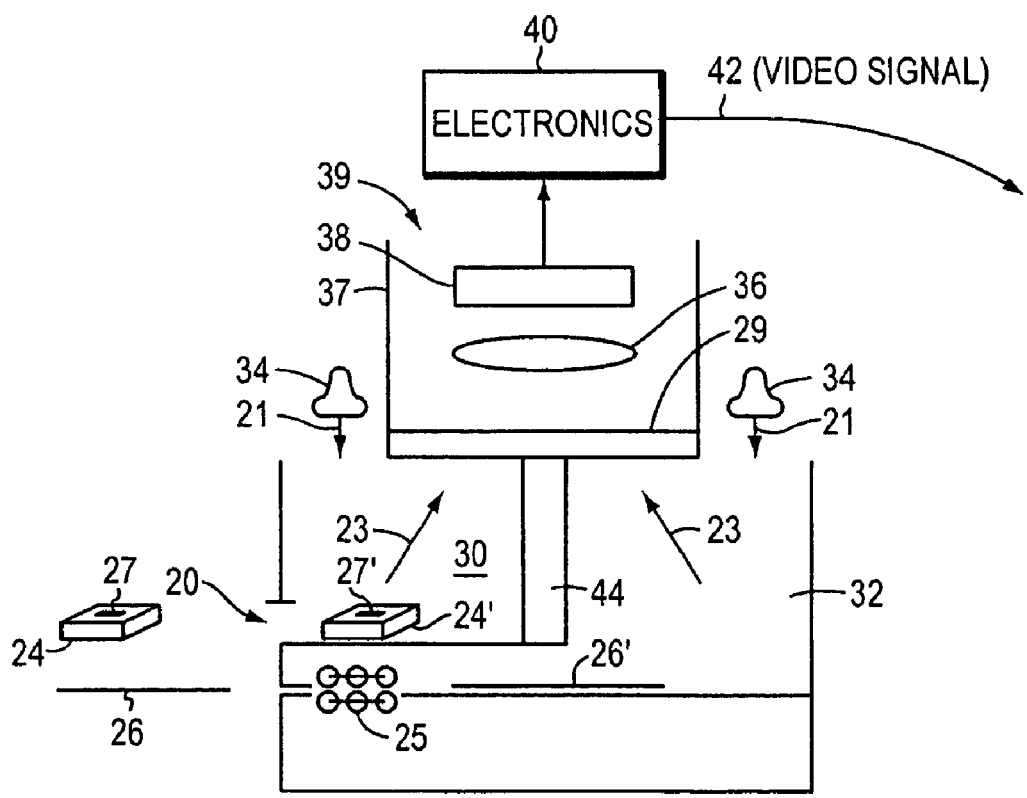
FIG. 2B is a schematic block diagram of an optical/electronics system suitable for use in the present invention.

FIG. 2B shows, within the terminal 3, a light source assembly 34 arranged around the sides of an optical imager filter 29, lens 36 and photo-sensitive surface 38. Here "optical imager" refers to the assembly 39 of the photo-sensitive surface 38, and the lens 36 and filter 29 (if present). The lens 36 and the filter 29 may not be present in some applications. Light rays 21 are prevented from shining directly into the filter 29 by the opaque sides 37. The light rays 21 emanate from the assembly 28 and rays 23 are reflected, e.g., from the ticket packet 24' and the playslip 26' and return to the optical imager 39.

A bulk item, in this case a packet of tickets 24' bearing a bar code 27 is inserted through the opening 20 into the chamber 30. The packet bar code 27' is illuminated by the light rays 21. A playslip 26 may be inserted into the opening 22 where the active drive mechanism 25 carries the play slip 26 into (and, later, out of) the chamber 32. The play slip 26' is also illuminated by the light rays 21. In both instances, reflected rays 23 from the ticket packet bar code 27' and the play slip 26' are returned to the optical imager 39.

The optical imager's photo-sensitive surface 38 is scanned by electronics 40 that output a video signal 42 as a data stream of pixels that carry an image. The software may interpret the entire photo-sensitive surface as one image even though there may be two or more different documents and/or bulk items with readable coded information. Alternatively, the software may separately interpret images from each document or bulk item. Each pixel is represented by an electrical signal (or group of signals) that represent optical values of intensity (gray levels and/or colors) at specific locations on each target. The image is an optical representation of the targets and the pixels run, generally, from left to right and top to bottom presenting the illuminated image of the targets 24' and 26'.

The light source assembly 34 in FIG. 2B illuminates both targets 24' and 26', and reflected light 23 from the targets returns to the optical filter 29. A single light source may be arranged to illuminate both targets, or an array of light sources may be arranged to illuminate both targets, or separate light sources, with different optical characteristics, may be each arranged to illuminate one target. Other surfaces within the cavities 30 and 32 are oriented and blackened to eliminate spurious reflections that might be returned to the optical filter. A baffle 44 is a physical barrier separating the chambers 30 and 32 from each other. In this manner, the target 24' will be imaged on about half of the photo-sensitive surface 38 while the light from target 26' will only strike the other portion of the photo-sensitive surface 38. In other embodiments, depending on the disposition of the baffle or baffles employed, different areas of the photo-sensitive surface will have images of other targets (not shown).

Illustratively, the filter 29 and the lens 36 both condition the light signals. The filter 29 may remove any background color associated with the targets, and the lens 36 focuses the light onto the photo-sensitive surface 38.

The photo-sensitive surface 38 may be one of many electronic optical arrays that are light sensitive, e.g., CCD, diode arrays, CMOS array, or any similar devices. (Even TV camera tubes may be used.) These optical arrays are usually scanned in an X/Y pattern that directly maps an area of the targets. As known to those skilled in the art, there will be a scaling factor and the scanned target area may not represent the entire target.

Figure 2C:
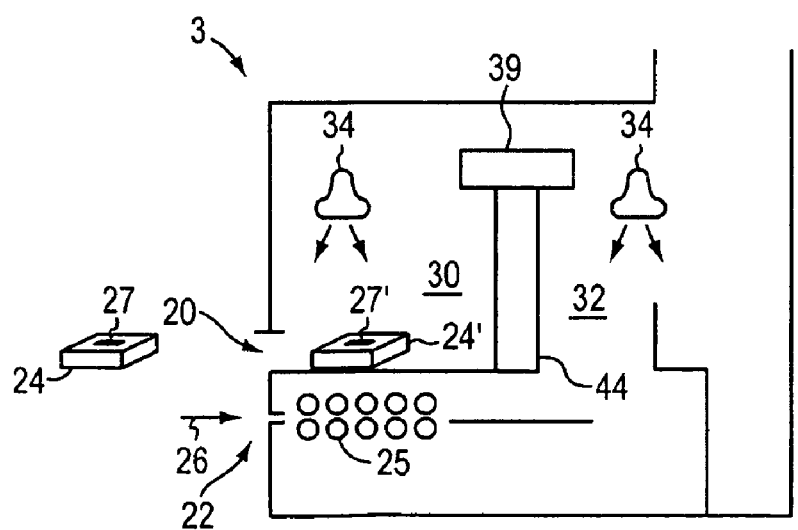
FIG. 2C is another view of an optical reader constructed in accordance with the present invention.

FIG. 2C illustrates the optical reader assembly 39 mounted vertically above two chambers 30 and 32 within a terminal 3. Two forms 24 and 26 lie below the optical reader 39 when inserted into the chambers 30 and 32, respectively.

Although two chambers, 30 and 32 separated by the baffle 44 are shown in FIG. 2C, other applications may include additional chambers having openings for receiving documents of bulk items. These additional chambers may comprise environments and may be separated by additional baffles that incorporate additional light sources. Additional active drive mechanisms may also be employed.

In yet other applications, the chambered assembly with an optical reader may be arranged in a stand alone configuration separate from other terminal functions (like communicating with a central office, etc.).

Figure 3:
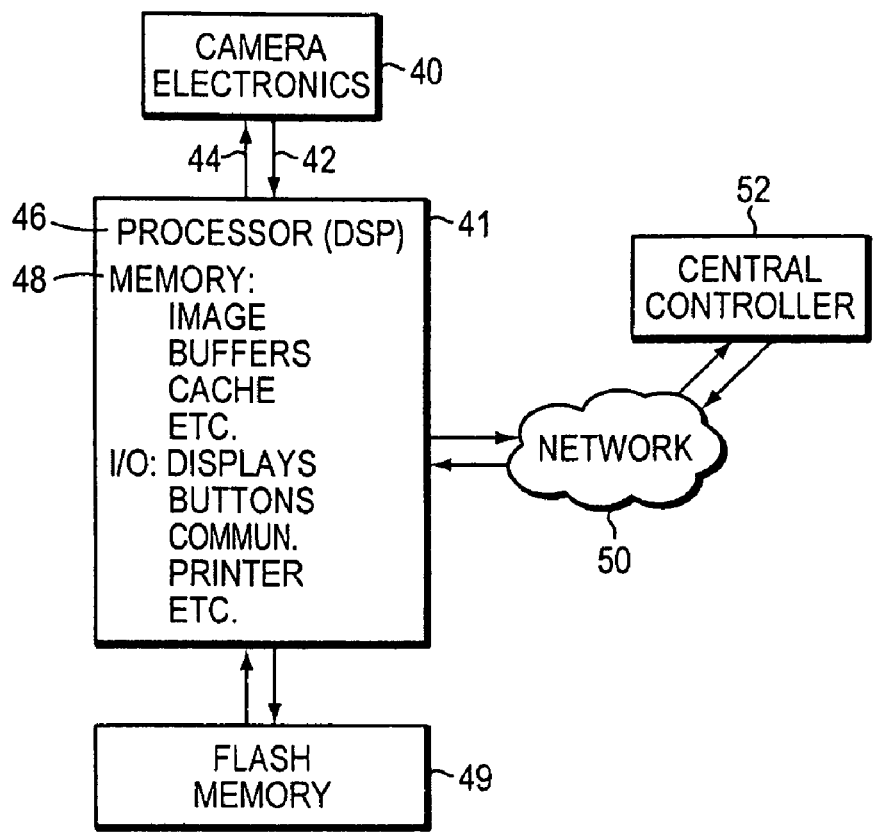
FIG. 3 is a block diagram of a hardware/software system suitable for use in the present invention.

FIG. 3 shows an image timing and control signal 45 to the camera electronics 40 and a video data stream 42 of pixels to the electronic assembly 41. The electronics assembly 41 has a processor system 46 that, preferably, includes a DSP (digital signal processor) or a FPGA (field programmable gate array), but a micro-processor may be used in some applications. The processing system 46 includes I/O device drivers and buffers for, at least buttons, display and communications. Memory 48 includes, at least, one or more image buffers and operating applications. In one embodiment and external, removable Flash memory 49 is used to up load the application program to the processor system 46. Removing the Flash memory 49 from the terminal 3 removes all the software from the terminal.

The network may be the Internet or a private network, but in either case the information must be encrypted to prevent outside interference such as, for example, in the illustration discussion of instant lottery tickets, with the gaming transactions, etc. According to this example, the bar code on a winning game ticket may be sent to a central controller 52 where the ticket is verified. Once verified, the central controller 52 will return authorization for the agent to pay the ticket.

Figure 4:
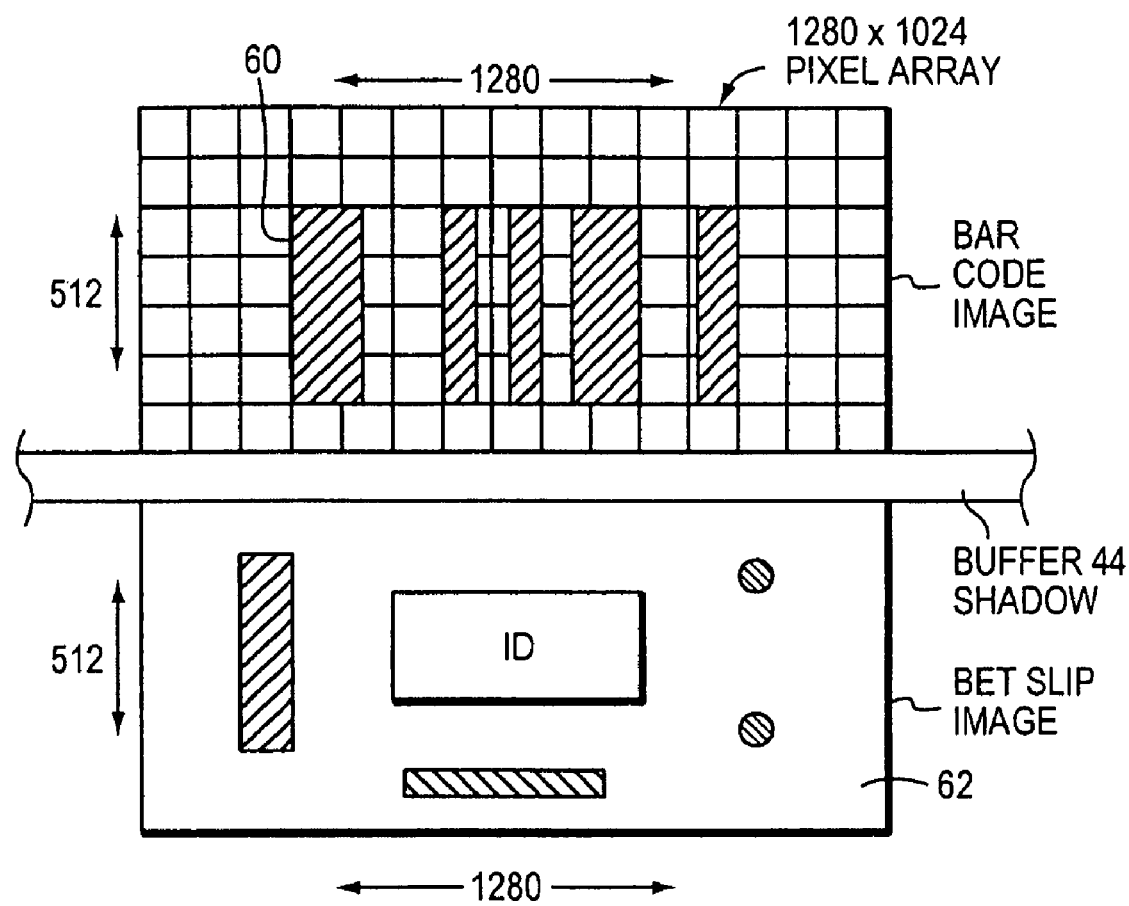
FIG. 4 is an illustration of a single camera field of pixels, 1280 by 1024, that is split into two fields, each field with a different image impressed thereon.

FIG. 4 represents a stylized version of the pixels entering the electronic assembly 41 with the targets 24' and 26' mapped thereon. In one embodiment, the pixels are distributed in a square pattern of 1280 by 1024 array of horizontal and vertical lines. Here half (512) of the lines are used for the bar code image 60 and half (512) for the play slip image 62. The pixel array by be proportioned differently and used to advantage reading different ticket and play slip types. The pattern of the bar code and the printed portions of the play slip are used by known programs to identify and read the information of the bar code and on the play slip.

The baffle 44 may cast a shadow on the photo-sensitive surface (here, a pixel array) that may remove several horizontal lines of pixels from participating in the images of the items in the chambers 30 and 32.

The reading of the bar code may include reading adjacent horizontal video lines and correlating the video patterns to define and then decode a bar code.

As mentioned above, the surface imaging the bar code and the surface imaging the bet slip may be two different surfaces that are electronically read out as one surface producing a single video signal. However, the bar code imager for the bar code may also be divided into two surfaces that adds a depth perception to the field of view. If the entire bar code is imaged on each of the two surfaces, a bulk item with a non-flat bar code may be read better with a depth of view provided by the binocular view.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. An optical reader for processing an image from at least two different chambers, the optical reader comprising:
   a first chamber for receiving a first document or bulk item;
   at least a second chamber for receiving a second document or bulk item;
   a baffle disposed between the first chamber and the second chamber;
   at least one a light source assembly for illuminating the first and the at least second chambers;
   an optical reader assembly having a photo-sensitive surface constructed to sense an image from the reflected light from each chamber, wherein a first portion of the photo-sensitive light surface is associated with light reflected from the first chamber and a second portion of the photo-sensitive surface is associated with light reflected from the second chamber;
   electronics for generating the image from the photo-sensitive surface; and
   software for decoding information from the image.

2. The optical reader of claim 1 further comprising:
   an optical filter that receives and optically filters the reflected light, and
   a lens to focus the reflected light onto the photo-sensitive surface.

3. The optical reader of claim 1 wherein the baffle is oriented substantially perpendicular to the photo-sensitive surface and extends up to near the photo-sensitive surface and essentially restricts the reflected light within each chamber.

4. The optical reader of claim 1 wherein each chamber defines a field of view.

5. The optical reader of claim 1 wherein the information in the images comprises a bar code and markings on a play slip.

6. The optical reader of claim 1 wherein the first document or bulk item is a packet of tickets and the second document or bulk item is a play slip.

7. The optical reader of claim 6 wherein the image from the reflected light from each chamber comprises an image of the packet of tickets in the first chamber when the first chamber contains the packet of tickets.

8. The optical reader of claim 6 wherein the image from the reflected light from each chamber comprises an image of the play slip in the second chamber when the second chamber contains the play slip.

9. The optical reader of claim 1 wherein the first document or bulk item is an instant ticket and the second document or bulk item is a packet of play tickets.

10. The optical reader of claim 1 further comprising an active drive mechanism that physically transports the first document to the first chamber.

11. The optical reader of claim 1 wherein the light source assembly includes a separate light source for each chamber.

12. A process for reading an image from at least two chambers, the process comprising the steps of:
   illuminating a first chamber;
   illuminating a second chamber that is at least partly separated from the first chamber by a baffle;
   simultaneously reflecting light from both chambers onto a photo-sensitive surface of an optical imager;
   creating an image from the light reflected from both chambers with the optical imager, wherein the reflected light from the first chamber illuminates a first portion of the photo-sensitive surface and the reflected light from the second chamber illuminates a second portion of the photo-sensitive surface; and reading coded information in the image.

13. The process of claim 12 further comprising the steps of:

focusing the reflected light onto the photo-sensitive surface, and filtering the reflective light before it impacts the photo-sensitive surface.

14. The process of claim 12 further comprising the step of:

separating the light reflected from the first environment from the reflected light from the second chamber, wherein the reflected light from the first chamber illuminates only a first portion of the photo-sensitive surface and the reflected light from the second chamber illuminates only a second portion of the photo-sensitive surface.

15. The process of claim 12 further comprising the step of transporting the first document to the first chamber.

16. The process of claim 12 further comprising:

separating the image into a first image associated with light reflected from the first chamber and a second image associated with light reflected from the second chamber.

17. The process of claim 16 wherein reading coded information in the image further comprises:

reading coded information in the first image; and reading coded information in the second image.

18. The process of claim 17 wherein reading coded information in the image further comprises:

reading coded information in the first image with a first decoding technique; and reading coded information in the second image with a second decoding technique.

19. The process of claim 18 wherein coded information in the first image comprises a bar code on an instant ticket and coded information in the second image comprises markings on a play slip.

20. The process of claim 12 further comprising:

eliminating a shadow area associated with the baffle from the image.

\* \* \* \* \*